Sept. 20, 1966 E. FATUZZO 3,274,567

FERROELECTRIC CONTROL CIRCUIT

Filed May 17, 1962 2 Sheets-Sheet 1

INVENTOR.
ENNIO FATUZZO
BY [signature]
Attorney

Sept. 20, 1966 E. FATUZZO 3,274,567

FERROELECTRIC CONTROL CIRCUIT

Filed May 17, 1962 2 Sheets-Sheet 2

INVENTOR.
ENNIO FATUZZO
BY Samuel Cohen
Attorney

United States Patent Office 3,274,567
Patented Sept. 20, 1966

3,274,567
FERROELECTRIC CONTROL CIRCUIT

Ennio Fatuzzo, Zurich, Switzerland, assignor to Radio Corporation of America, a corporation of Delaware
Filed May 17, 1962, Ser. No. 195,453
12 Claims. (Cl. 340—173.2)

The present invention relates to a ferroelectric control circuit which is useful, for example, in ferroelectric electroluminescent panel type displays such as mural television displays, ferroelectric memories, and numerous other ferroelectric storage and control circuits.

When an electric field is applied to a ferroelectric material, the material exhibits a relationship between the polarization of its "bound charge" and the applied field in the general form of the hysteresis loop exhibited by ferromagnetic materials. "Bound charge" refers to the electric dipoles in the material. By utilizing the ferroelectric material as the dielectric of a capacitor, this hysteresis effect can be employed for the storage of binary information, for the control and switching of electric signals, and for other purposes. Circuits employing such storage elements are discussed in Patent Nos. 2,695,397 and 2,695,398 to J. R. Anderson, and elsewhere in the literature.

It is desirable in circuits employing ferroelectric storage elements that the polarization of the elements not be changed appreciably until the applied field exceeds a given threshold value. It would appear from the 60 cycle hysteresis loop associated with a ferroelectric storage element that this threshold value corresponds to a point somewhat beyond the knee of the hysteresis loop, similarly to the threshold magnetic field in the case of ferromagnetic materials. In practice, this has not been found to be the case. Ferroelectric materials do not exhibit a threshold electric field. They can be switched from one state of polarization at saturation to the other state of polarization at saturation by applying a very small electric field (much lower than that corresponding to the knee of the hysteresis loop), if applied a sufficient number of times or if applied for a sufficiently long time.

The deficiency above is a serious deterrent to the use of ferroelectric materials in storage applications such as coincident current memories and electroluminescent panels. In both of these applications, a storage element should be switched or partially switched from one state to another in response to two coincident pulses but should not be switched in response to only one of the two pulses. If the element does not have a threshold value, then that element may be switched over a period of time by the application of successive single pulses (sometimes known as "disturb" or "half-select" pulses). This eventually destroys, or at least distorts, the information stored in the element.

The present invention relates to a system employing ferroelectric storage elements which responds to coincident pulses but which is substantially unaffected by "disturb" pulses. The system includes a first circuit having a source, a load which is to be driven by the source, and ferroelectric elements which store charges of opposite polarity and essentially prevent the source from actuating the load. A second circuit coupled to the first circuit unblocks the storage elements and thereby permits the source to actuate the load when the second circuit receives coincident pulses. However, when the second circuit receives only disturb pulses, the second circuit provides for these disturb pulses an alternate path which is preferred to the path containing the load and essentially prevents these disturb pulses from affecting the ferroelectric elements or load in the first circuit.

The invention is discussed in greater detail below and is shown in the following drawings of which:

Figure 2:
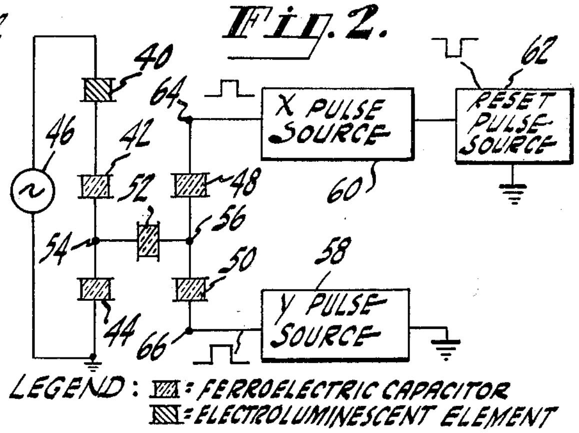
FIG. 2 is a block and schematic circuit diagram of an embodiment of the present invention.
Figure 3A:
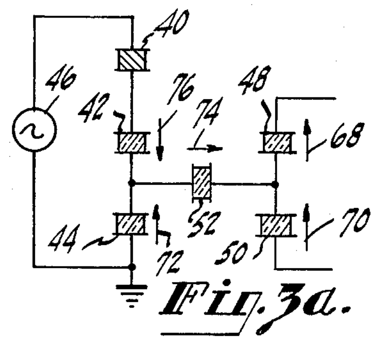
Figure 3B:
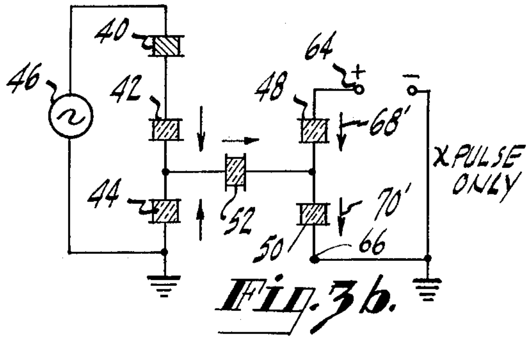
Figure 3C:
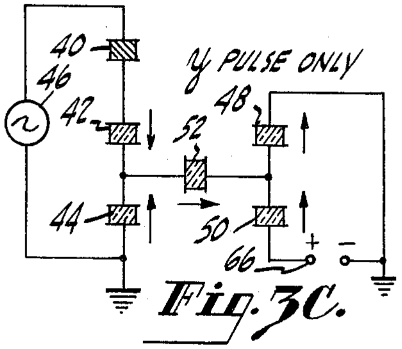
Figures 3D, 4:
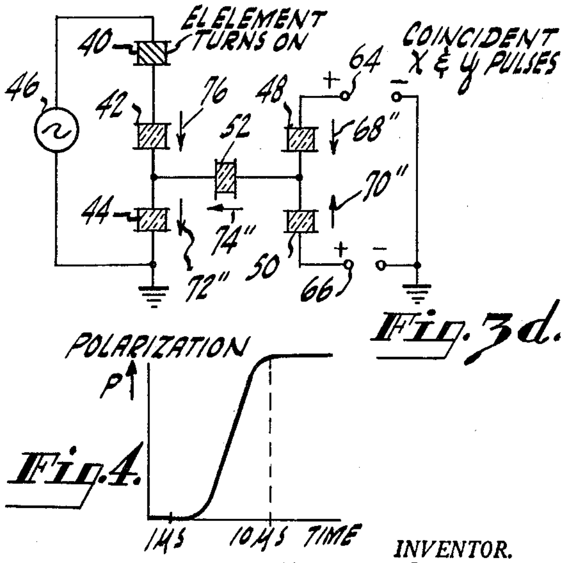
Figure 5:
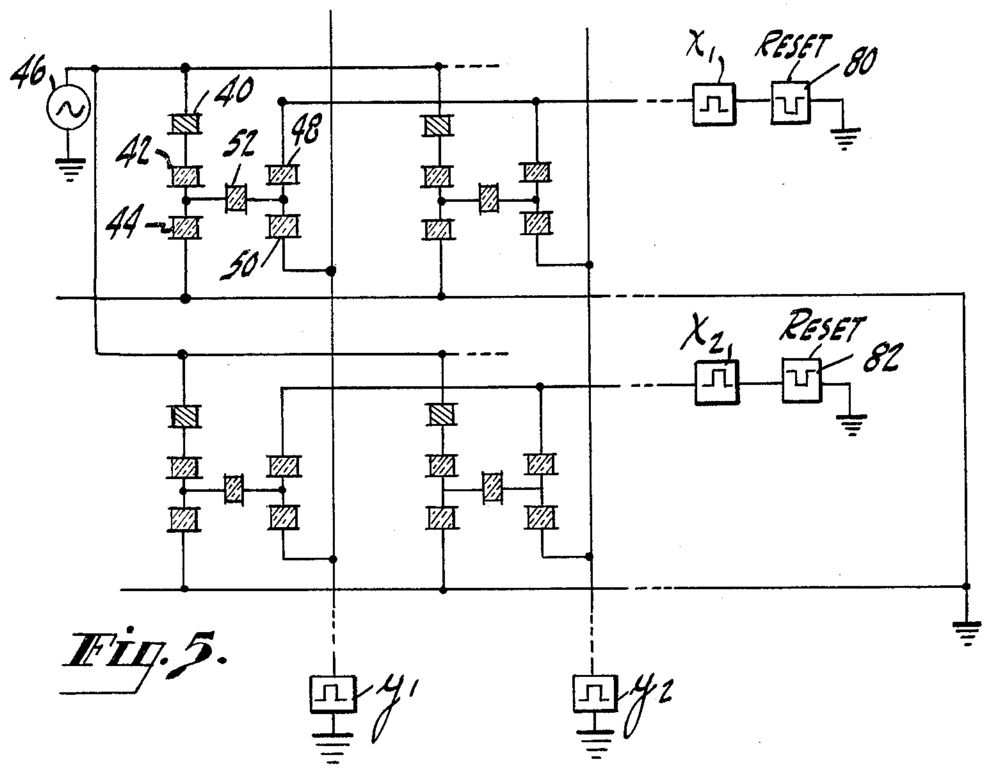
Figures 6, 7:
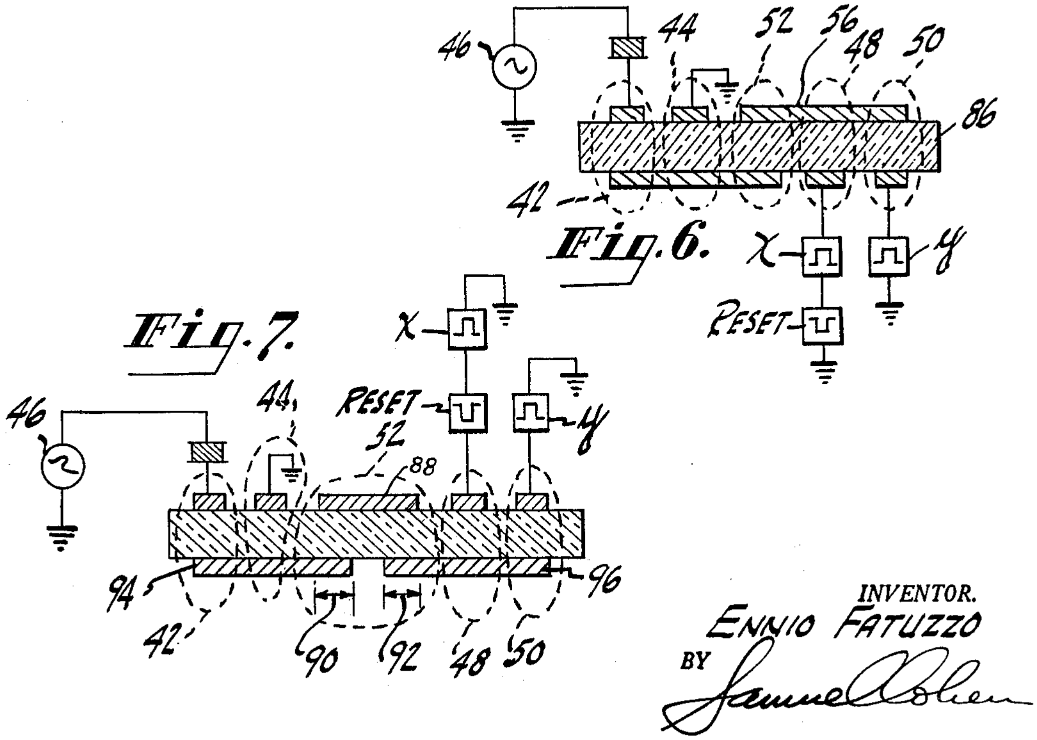

FIGS. 3*a*–3*e* are equivalent circuits to illustrate the operation of the circuit of FIG. 2;

FIG. 4 is a graph to help explain the operation of the circuit of FIG. 2;

FIG. 5 is a schematic circuit diagram of an electroluminescent display panel according to the invention;

FIG. 6 is a cross-sectional view illustrating a way in which a ferroelectric circuit according to the present invention may easily be fabricated; and FIG. 7 is a cross-sectional view of an alternate ferroelectric storage element construction.

Throughout the figures similar reference numerals are applied to similar elements.

Figure 1:
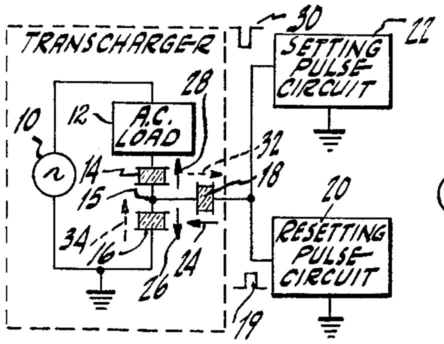
FIG. 1. PRIOR ART
FIG. 1 is a block and schematic diagram of a prior art circuit employing ferroelectric storage elements.

The circuit of FIG. 1 is a schematic showing of a circuit described in detail in Rajchman et al., Patent No. 2,900,-622, issued Aug. 18, 1959. The circuit within the dashed block is commonly known as a "trans-charger." It includes an alternating current source 10 in series with an alternating current (A.C.) load 12 and two ferroelectric storage elements 14 and 16. Load 12 is illustrated in the patent as a capacitor. One terminal of the source 10 is connected to ground. A third ferroelectric storage element 18 is connected to a terminal 15 between storage elements 14 and 16.

Preferably, the dielectric material in the storage element (capacitor) 16 is thinner than the dielectric material of storage element 14. The terms "thin" and "thick" refer to the dimension of the dielectric material perpendicular to the metal capacitor electrodes—essentially the spacing between electrodes. The dielectric material of ferroelectric element 18 is preferably somewhat thicker than that of either ferroelectric elements 14 or 16. The reasons for this are discussed in the patent. Blocks 20 and 22 represent the setting and resetting circuits, respectively. Diodes, resistors and the like not essential to an understanding of general principles of circuit operation are assumed to be present within block 20 (and also within block 22) and are not illustrated separately. These elements are shown in the Rajchman et al. patent.

In the operation of the circuit of FIG. 1, a positive reset pulse 19 is initially applied to the transcharger from resetting pulse source 20. The positive pulse is of sufficient amplitude and duration to polarize the ferroelectric storage elements in the directions indicated by arrows 24, 26 and 28. It might be mentioned here, that the convention is adopted that the head of an arrow indicates a positive charge, and the tail of the arrow a negative charge. When a ferroelectric element is switched by a source producing a positive pulse, the head of the arrow is caused to face away from the source.

The arrows 26 and 28 point in opposite directions. This indicates that the ferroelectric capacitors 14 and 16 are polarized in opposite directions. Under these conditions—as explained in detail in the patent above, the capacitors 14 and 16 act like a very high value of alternating current impedance and essentially block the path between the alternating current source 10 and the alternating current load 12. Put another way, the major portion of the voltage available at the output of source 10 develops across the ferroelectric storage elements 14 and 16 and only a very small voltage develops across the alternating current load 12.

A negative pulse 30 may now be applied to the transcharger by setting pulse circuit 22. The negative pulse "sees" ferroelectric storage element 18 in series with ferroelectric storage element 16. It also sees ferroelectric storage element 18 in series with ferroelectric storage element 14. Ferroelectric storage element 16 has a thickness of ferroelectric material which is less than that of element 14 and it is therefore a preferred path for the pulse 30. The pulse therefore switches (or partially switches) the polarization of ferroelectric storage elements 18 and 16. This switching is indicated schematically by dashed arrows 32 and 34. The amount of switching which occurs depends upon the amplitude and duration of pulse 30. Arrow 34 is now in the same direction as arrow 28. Thus, the circuit 10, 12, 14, 16 is unblocked, or at least partially unblocked, and a greater portion of the source voltage 10 is applied to the load 12.

As mentioned in the introductory portion of the present application, ferroelectric storage elements do not exhibit a true threshold electric field. It is for this reason that certain difficulties arise when it is attempted to employ a circuit such as the one of FIG. 1, for example, in coincident current applications. In such applications, the alternating current load 12 may be a read-out device. A source of $x$ pulses and a source of $y$ pulses would be substituted for the setting pulse circuit 22. Coincident $x$ and $y$ pulses taken together have an amplitude sufficient to exceed the threshold electric field (known in the art as the "coercive field") of element 18. Such pulses therefore switch ferroelectric elements 18 and 16 and unblock the transcharger. However, half select pulses, that is, an $x$ pulse alone or a $y$ pulse alone should not unblock the transcharger. In practice, this does not occur. Instead, successive half-select pulses also switch elements 16 and 18 and unblock the transcharger. This is a serious disadvantage. It can, in some cases, be corrected by resetting the transcharger after each half select pulse but this solution is not satisfactory or practical in certain applications.

A preferred form of the present invention is shown in FIG. 2. The circuit includes as the A.C. load an electroluminescent element 40. It is in series with ferroelectric storage elements 42 and 44, and alternating current source 46. The source 46 may be a sine wave source, however, a source of alternating current waves other than of sinusoidal shape would be acceptable instead. There are three additional ferroelectric storage elements, namely 48, 50 and 52. Elements 48 and 50 are connected in series and element 52 is connected between the common connection 54 between elements 42 and 44 and the common connection 56 between elements 48 and 50.

A source of positive pulses, legended $y$ pulse source 58, is connected between ferroelectric element 50 and a source of reference potential such as ground. A second source of positive pulses, legended $x$ pulse source 60, is connected between ferroelectric element 48 and reset pulse source 62. The latter is connected also to ground. The reset pulse source produces negative pulses and, when connected in series with the $x$ pulse source, as shown, has a low alternating current impedance when in its inactive condition. The $x$ and $y$ pulse sources also have a low alternating current impedance when in their inactive condition.

The operation of the circuit of FIG. 2 is depicted in FIGS. 3*a*–3*e*. The initial polarization assumed for the ferroelectric elements is shown in FIG. 3*a*. FIG. 3*b* shows what occurs when an $x$ pulse only is applied to input terminal 64. Inactive sources which present a low impedance are represented here and in FIGS. 3*c*–3*e* as a direct connection. Thus, terminal 66 is shown directly connected to ground rather than to the source 58. The $x$ pulse sees a low impedance path through ferroelectric elements 48 and 50. The polarization of these elements is such that the positive pulse switches the elements 48 and 50 to their opposite condition as indicated by arrows 68′ and 70′.

There is also a second path along which switching is possible. It includes ferroelectric storage elements 44, 52 and 48. Note that the polarization of these ferroelectric elements, as indicated by arrows 72, 74 and 68 in FIG. 3*a*, is in the same direction. However, as there are more ferroelectric elements in this path, and therefore a greater effective thickness of dielectric material to switch, than in the path containing elements 48 and 50, the latter path is a preferred path. To enhance this effect, it is preferred that the dielectric material of which element 52 is made be substantially thicker than that of the dielectric material of the other elements. In practice, as is pointed out later, the element 52 may be two or more times (thicker than) the remaining elements 42, 44, 48 and 50.

In one practical circuit to be discussed later, the thickness of the dielectric elements is so chosen that it requires about 10 microseconds to switch the three elements 44, 52 and 48 and requires only 1 microsecond to switch the two elements 48 and 50. In this practical circuit, the dielectric material of elements 42, 44, 48 and 50 is of the same thickness and the dielectric material of element 52 is thicker than that of the other elements. The graph of FIG. 4 illustrates the amount of charge switched, that is, the polarization versus the time, for a path containing ferroelectric storage materials which requires 10 microseconds to switch. As can be seen by this curve, the rate of change of polarization is extremely low at the beginning of the switching. In 1 microsecond, which is the time necessary to switch elements 48 and 50, practically none of the material of elements 52 and 44 has changed its direction of polarization. It is therefore clear that the polarization of element 44 is substantially unaffected by an $x$ pulse alone.

It is also clear from FIGS. 3*a* and 3*b* that it is not possible for element 42 to be switched in response to an $x$ pulse alone. The reasons are quite similar to those discussed above. The effect may be enhanced, that is, the element 42 prevented from switching, by making the dielectric material of element 42 somewhat thicker than that of element 44. However, this is not essential and, in practice, good results have been obtained with elements 42 and 44 having dielectric material of the same thickness. The effect may also be enhanced by connecting a biasing battery in series between the source 46 and the electroluminescent element 40. This is not essential either and good results have been obtained without it. The battery, if employed, is connected with its positive pole connected to the electroluminescent element 40 and its negative pole connected to the source 46.

FIG. 3*c* illustrates what occurs in the circuit when a $y$ pulse only is applied to terminal 66. The elements 50 and 48 are already polarized in the correct direction with respect to the positive pulse. Therefore, these elements do not switch and consequently switching along path 50, 52, 42 or path 50, 52, 44 is not possible because these paths are blocked. Note that element 52 is polarized in the "wrong" direction with respect to 50.

FIG. 3*d* illustrates the circuit operation when coincident $x$ and $y$ pulses are applied. Under these conditions, terminals 64 and 66 are of the same polarity and at the same or substantially the same voltage level. The path 48, 50 therefore does not switch. But, there is a possible path through elements 48, 52 and 44. As can be seen in FIG. 3*a*, the polarization of these elements is in the same direction (arrows 72, 74 and 68 all point in the direction of terminal 64). The positive pulse applied to terminal 64 therefore switches the polarization of elements 48, 52 and 44 as indicated by arrows 68″, 74″ and 72″ in FIG. 3*d*. Now the ferroelectric elements 42 and 44 are polarized in the same direction as indicated by arrows 76 and 72″. Accordingly, the circuit 40, 42, 44, 46 is unblocked and the electroluminescent element 40 is energized.

If the simultaneous pulses applied to terminals 64 and 66 are of sufficient amplitude and duration, the polarization of element 44 is completely switched from one state to the other. This completely unblocks the circuit and turns on electroluminescent element 40 to maximum brightness. It is often desirable, however, in certain electroluminescent panel displays such as television displays to be able to obtain half tones. This is possible with the circuit shown. The coincident $x$ and $y$ pulses applied to terminals 64 and 66 may be of insufficient amplitude and/or duration fully to switch the polarization of element 44 but of sufficient amplitude or duration to cause partial switching. In a practical circuit, it may be desirable to apply $x$ pulses of fixed amplitude and $y$ pulses of an amplitude (or duration) proportional to the amount of brightness desired in the particular picture element (that is, the electroluminescent element 40) selected by the coincident pulses, provided the difference in $x$ and $y$ pulse amplitudes is not too great. Alternatively, $x$ and $y$ pulses may both be of the same amplitude and this amplitude varied to obtain half tones. This arrangement is advantageous as coincident and equal $x$ and $y$ pulses always develop a zero voltage difference across elements 50, 48.

Once the electroluminescent element 40 is turned on, it remains on until reset. This is so because the path in which elements 48, 50 appear is now blocked. Note that the arrows 68'' and 70'' are now in opposite directions indicating polarization in opposite directions. Therefore, a disturb pulse applied either to terminal 64 or 66 cannot pass through the path of elements 48 and 50. A disturb pulse could pass through a path such as 50, 52, 44 or 48, 52, 44 but these paths are already polarized in the correct direction with respect to a disturb pulse so that no switching can occur. In the event that the polarization of elements 44 and 42 is in a direction opposite than that indicated by arrows 72'' and 76, the situation would still be the same. The low impedance path, which then would include element 42, would be polarized in a direction such that a disturb pulse would cause no switching.

Figure 3E:
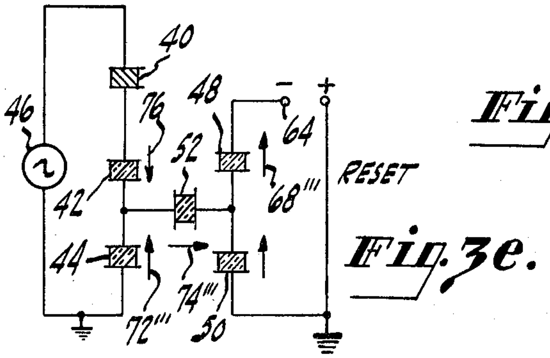

The resetting of the circuit is illustrated in FIG. 3*e*. To effect resetting a negative pulse is applied to terminal 64. (The reset pulse could instead be applied to terminal 66, if desired.) As can be seen in FIG. 3*d*, elements 48, 52 and 44 are all polarized in the same direction. When a negative pulse is applied to terminal 64, this pulse switches the polarization of these three elements, as indicated by arrows 68''', 74''' and 72''' in FIG. 3*e*. Now elements 50 and 48 are polarized in the same direction so that the path containing these elements is unblocked. However, elements 42 and 44 are polarized in opposite directions and therefore the path containing these elements is blocked. Under these conditions, the electroluminescent element 40 is inactivated.

FIG. 5 illustrates a 2 x 2 array of "cells" of an electroluminescent panel display. In practice, the display may be much larger than this, however, the four cells shown illustrate the principle of operation. For a low speed display such as might be required for radar, numerical display boards, or the like, the $x$ and $y$ coincident pulses may be applied directly to the storage elements of the invention. There are two $x$ pulse sources $x_1$ and $x_2$ shown and two $y$ pulse sources $y_1$ and $y_2$ shown. The alternating current source 46 is common for the entire panel. The point of reference potential, shown as ground, is also common for the entire panel. Line and column selector circuits and similar well-known circuits may be employed for addressing the cells instead of individual drivers for each line and column; however, as these play no direct part in the present invention, they are not shown.

There may be one reset means common to the entire panel, however, it is preferable that there be a reset means per line (assuming higher speed scan in the line direction, and lower speed scan in the column direction, as in television). The reset means are shown at 80 and 82, respectively. Reset of a line at a time permits each line on the panel to remain on for substantially the entire interval information is being written in the remaining lines of the panel (an entire frame interval) and, in this way, the overall brightness of the display is increased.

In operation, a line is first reset and then information is written into the line. The information remains stored in the line until the line is reset during the next write cycle for that line. For example, in an electroluminescent panel containing 600 lines, a line of information may be written during a first time interval. This line will remain on, that is, the selected electroluminescent elements in the line will remain activated, until the 601'st time interval when that line must be reset and new information applied.

For a high speed display, such as required for mural television, it is preferred to write the information into the display panel a line at a time rather than a bit at a time. In a practical system, there may be only 60 microseconds available to write a line of information. This information may be temporarily stored in a memory section having, for example, 600 high speed storage elements. This assumes 600 storage elements per line. The contents of the memory may then be transferred in parallel into a line of the display panel. This may be done by applying the bits in the memory to the column wires and at the same time applying a selection pulse to the $x$ line of the memory into which the contents of the memory is to be transferred. Concurrently, a second memory section may temporarily receive data to be applied to the next line of the panel. A detailed description of the system employing a memory for temporarily storing the information to be written a line at a time may be found in Rajchman Patent No. 3,021,387, issued Feb. 13, 1962.

The reason for writing a line at a time rather than a bit at a time is to permit storage elements having a somewhat lower response time to be employed. As already mentioned, it may require 10 microseconds to write information into an electroluminescent storage cell using the circuit of the present invention. If there are 600 cells per line and only 60 microseconds are permitted to write a piece of information into each line, then only $\frac{1}{10}$ of a microsecond is available to write information into a cell if coincident pulses are applied directly to the cell. On the other hand, if the information is written into the memory, a line at a time, 60 microseconds are available for writing into each electroluminescent cell in a line and this is well within the capability of the system discussed.

The ferroelectric circuit of the present invention includes five ferroelectric storage elements. A simple way such a circuit may be constructed is shown in FIG. 6. It includes a single crystal 86 of a ferroelectric material with electrodes made of gold evaporated onto the crystal. The correspondence between the ferroelectric storage elements of FIGS. 6 and 2 should be clear from the identifying numerals applied to the various elements. A structure such as shown in FIG. 6 is suitable for mass production techniques. In making such an element the electroluminescent element may be laid down on the same crystal 86 as the ferroelectric capacitor plates. However, this is not shown in FIG. 6.

In the embodiment of the invention shown in FIG. 6, the thickness of dielectric material for the ferroelectric capacitor 52 is the same as that for the other ferroelectric capacitors. It is possible using the same technique to make the storage element 52 have substantially larger effective dielectric thickness. One such structure is illustrated in FIG. 7. The ferroelectric storage element 52 includes electrode 88 and portions 90 and 92 of electrodes 94 and 96, respectively. This is essentially two ferroelectric capacitors in series so that the effective thickness of dielectric material is double that of a single ferroelectric capacitor such as 50 or 48, for example.

The same technique may be employed, if desired, to obtain a ferroelectric capacitor 52 of triple, quadruple or greater thickness, as desired for the particular requirements at hand.

In a practical ferroelectric circuit according to the present invention, the following circuit elements may be employed. These are merely illustrative and are not to be taken as limiting.

Ferroelectric elements 42, 44, 48 and 50—thickness of dielectric material 0.15 mm., electrode area 3 mm.$^2$.

Ferroelectric element 52—thickness of dielectric material 0.3 mm., electrode area 3 mm.$^2$.

Ferroelectric material—triglycine sulfate single crystals.

Electrode material—gold, evaporated under vacuum onto the triglycine sulfate through appropriate masks.

Electroluminescent cell may be as described in the Rajchman Patent No. 3,021,387 cited above. Preferably, the capacitance of the electroluminescent element is substantially larger than that of ferroelectric elements such as 42 and 44. For example, the capacitance of the electroluminescent element may be 10 times that of a ferroelectric element such as 42. In one practical application the electroluminescent cell had a capacitance of about 50 picofarads and the ferroelectric elements such as 42 had a capacitance of about 5 picofarads.

Frequency of source 46—10,000 to 20,000 kilocycles—it is found that as the frequency increases, the contrast and brightness also increases. However, as the frequency increases, the power dissipation in the panel also increases. Even though the power dissipation increases, the power dissipated by the electroluminescent cells remains roughly constant with increase in frequency. The frequency given of 10,000 to 20,000 kilocycles is a reasonable compromise to obtain quite good contrast and brightness and still to keep the total power dissipated at a relatively low figure.

Voltage amplitude of sine wave applied by source 46—200 volts peak—it is found that the contrast increases with voltage and reaches a maximum value at about 180 volts when the amplitude of the sine wave is just about sufficient to switch the whole polarization.

Amplitude of coincident current pulses—about 50 volts.

Duration of coincident current pulses—up to 60 microseconds.

The alternating current source 46 may cause some partial (spurious) switching (unblocking) if the sine wave amplitude is too high. A simple way to prevent this is to use a thick ferroelectric layer for element 52 (say at least double the thickness of the ferroelectric layer of the other elements) as already discussed. Another way is to substitute for source 46 two sources, one providing positive half cycles of a sine wave and the other providing also positive half cycles of a sine wave of the same frequency, but during the periods intermediate the periods of the sine wave from the first source. These two sources are connected in series and the ground connection is moved to the common connection between the two sources rather than as shown in FIG. 2.

What is claimed is:

1. In combination, an electroluminescent element, first and second ferroelectric storage elements and an alternating current source, all connected in series and a point in the circuit between one of said elements and said electroluminescent element being connected to a point of reference potential; third and fourth ferroelectric storage elements connected in series; a fifth ferroelectric storage element connected between the common connection between said first and second elements and the common connection between said third and fourth elements; and two pulse source means one connected between the free connection to said third element and said point of reference potential, and the other connected between the free connection to said fourth element and said point of reference potential.

2. In combination, an alternating current load, first and second ferroelectric storage elements, and an alternating current source, all connected in series; means for polarizing said elements in opposite directions; and means including third and fourth series connected ferroelectric storage elements coupled to said first and second elements responsive to a single pulse for providing a low impedance path for said pulse, and responsive to two concurrent pulses for reversing the polarization of one of said storage elements.

3. In combination, an alternating current load, first and second ferroelectric storage elements, and an alternating current source, all connected in series; means for polarizing said elements in opposite directions; two series connected ferroelectric storage elements coupled at the common connection between said elements to the common connection between said first and second elements; and first and second pulse sources respectively coupled to the free electrodes of said third and fourth ferroelectric storage elements, said third and fourth elements providing a low impedance path for non-concurrent pulses from said sources, and one of said third and fourth, plus one of said first and second elements, providing a path for concurrent pulses from said sources, respectively, whereby concurrent pulses cause the polarization of one of said first and second elements to reverse.

4. In combination, two series connected ferroelectric storage elements; means for applying a signal to said elements to render them operable to block an alternating signal applied across said elements; and means coupled to said elements for bypassing a single pulse which would otherwise at least partially unblock said elements, and responsive to two concurrently applied pulses for applying a signal to said elements to render them operative to transmit an alternating current signal applied across said elements.

5. In combination, two series connected ferroelectric storage elements; means for applying a pulse of given polarity to said elements to render them operable to block an alternating signal applied across said elements; and means coupled to said elements for bypassing a single pulse of opposite polarity which would otherwise at least partially unblock said elements, and responsive to two concurrently applied pulses of said opposite polarity for applying a pulse to said elements to render them operative to transmit said alternating current signal applied across said elements.

6. In combination, two series connected ferroelectric storage elements; means for applying a pulse of given polarity to said elements for polarizing said elements in opposite directions to render them operable to block an alternating signal applied across said elements; and means coupled to said elements for bypassing a single pulse of opposite polarity which would otherwise at least partially unblock said elements, and responsive to two concurrently applied pulses of said opposite polarity for applying a pulse to said elements for reversing the polarization of one of said elements to render said elements operative to transmit said alternating current signal applied across said elements.

7. In combination, an alternating current load, first and second ferroelectric storage elements and an alternating current source, all connected in series; third and fourth ferroelectric storage elements connected in series; and a fifth ferroelectric storage element connected between the common connection between said first and second elements and the common connection between said third and fourth elements.

8. In the combination as set forth in claim 7, all five of said ferroelectric storage elements employing a common ferroelectric body as the dielectric thereof.

9. In combination, an alternating current load, first and second ferroelectric storage elements and an alternating current source, all connected in series, and a point in the circuit between one of said elements and said source being connected to a point of reference potential; third and fourth ferroelectric storage elements connected in series; a fifth ferroelectric storage element connected between the common connection between said first and second elements and the common connection between said third and fourth elements; and two pulse source means, one connected between the free connection to said third element and said point of reference potential, and the other connected between the free connection to said fourth element and said point of reference potential.

10. In the combination as set forth in claim 9, all of said ferroelectric elements having, in common, one ferroelectric body as the dielectric thereof.

11. In combination, an alternating current load, first and second ferroelectric storage elements and an alternating current source, all connected in series and a point in the circuit between one of said elements and said source being connected to a point of reference potential; third and fourth ferroelectric storage elements connected in series; a fifth ferroelectric storage element having a substantially longer switching time than any of the other storage elements connected between the common connection between said first and second elements and the common connection between said third and fourth elements; and two pulse source means one connected between the free connection to said fourth element and said point of reference potential and the other connected between the free connection to said third element and said point of reference potential.

12. In combination, an alternating current load, first and second ferroelectric storage elements and an alternating current source, all connected in series and a point in the circuit between one of said elements and said source being connected to a point of reference potential; third and fourth ferroelectric storage elements connected in series; a fifth ferroelectric storage element having a substantially longer switching time than any of the other storage elements connected between the common connection between said first and second elements and the common connection between said third and fourth elements; two pulse source means one connected between the free connection to said fourth element and said point of reference potential and the other connected between the free connection to said third element and said point of reference potential; and a reset circuit coupled through said fifth element to the circuit which includes said first and second elements.

References Cited by the Examiner

UNITED STATES PATENTS

| | | | |
|---|---|---|---|
| 2,904,626 | 9/1959 | Rajchman | 340—173.2 |
| 2,945,994 | 7/1960 | Dazzi | 317—258 |
| 2,960,691 | 11/1960 | Wolfe | 340—173.2 |
| 2,997,635 | 8/1961 | Robinson | 317—258 |
| 3,011,157 | 11/1961 | Anderson | 340—173.2 |
| 3,018,412 | 1/1962 | Asars | 340—173.2 |
| 3,054,091 | 9/1962 | Brennemann | 340—173.2 |

References Cited by the Applicant

UNITED STATES PATENTS

| | | |
|---|---|---|
| 2,470,893 | 5/1949 | Hepp. |

FOREIGN PATENTS

| | | |
|---|---|---|
| 523,556 | 4/1956 | Canada. |
| 629,173 | 10/1961 | Canada. |
| 629,670 | 10/1961 | Canada. |

BERNARD KONICK, *Primary Examiner.*

JAMES W. MOFFITT, IRVING SRAGOW, *Examiners.*

T. W. FEARS, *Assistant Examiner.*